United States Patent
Nishikawa et al.

(10) Patent No.: US 9,071,068 B2
(45) Date of Patent: Jun. 30, 2015

(54) CHARGE/DISCHARGE CONTROL APPARATUS

(75) Inventors: Kazufumi Nishikawa, Moriguchi (JP); Yasuo Okuda, Moriguchi (JP); Atsushi Ouchi, Moriguchi (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 258 days.

(21) Appl. No.: 13/807,910

(22) PCT Filed: Jun. 29, 2011

(86) PCT No.: PCT/JP2011/064903
§ 371 (c)(1),
(2), (4) Date: Dec. 31, 2012

(87) PCT Pub. No.: WO2012/002429
PCT Pub. Date: Jan. 5, 2012

(65) Prior Publication Data
US 2013/0099751 A1 Apr. 25, 2013

(30) Foreign Application Priority Data
Jun. 30, 2010 (JP) .................................. 2010-150303

(51) Int. Cl.
*H02J 7/00* (2006.01)
*H01M 10/44* (2006.01)
(Continued)

(52) U.S. Cl.
CPC ............. *H02J 7/0068* (2013.01); *H01M 10/44* (2013.01); *H01M 10/48* (2013.01); *H02J 3/32* (2013.01);
(Continued)

(58) Field of Classification Search
CPC ..... H02J 2007/005; H02J 7/042; H02J 7/044; H01M 10/44; H01M 10/448; H01M 10/482; B60L 3/0046; Y02T 10/6286; Y02T 10/7005
USPC .......................................... 320/102, 128, 132
See application file for complete search history.

(56) References Cited

U.S. PATENT DOCUMENTS

2003/0047209 A1 3/2003 Yanai et al.
2004/0066171 A1 4/2004 Mori
(Continued)

FOREIGN PATENT DOCUMENTS

EP 2139090 A1 12/2009
JP 62-141448 A 6/1987
(Continued)

OTHER PUBLICATIONS

Supplementary European Search Report issued in European Application No. 11 80 0891, dated Apr. 10, 2014, 2 pgs.
(Continued)

*Primary Examiner* — Vuthe Siek
(74) *Attorney, Agent, or Firm* — McDermott Will & Emery LLP

(57) ABSTRACT

An estimation unit estimates the amount of power consumption for each unit period of time. A rechargeable battery control unit controls the rechargeable battery such that an exceeding amount of power worth the amount of power exceeding a target amount of power during a unit period of time is charged into the battery, and power is discharged from the battery during a time zone wherein the target amount of power is exceeded, on the basis of the result of the estimation. When the battery needs to be charged in excess of the upper-limit value, the control unit charges the battery up to the upper-limit value during a time zone wherein the amount of power consumption estimated is light, and the amount of power that exceeds the upper-limit value is charged during a time zone that is close to the time zone wherein the target amount of power is exceeded.

9 Claims, 8 Drawing Sheets

(51) Int. Cl.
*H01M 10/48* (2006.01)
*H02J 3/32* (2006.01)
*H02J 7/04* (2006.01)
*H02J 3/34* (2006.01)
*H02J 3/14* (2006.01)

(52) U.S. Cl.
CPC .. *H02J 7/042* (2013.01); *H02J 3/34* (2013.01); *H02J 2003/143* (2013.01); *H02J 2003/146* (2013.01); *H02J 7/044* (2013.01); *H02J 2007/005* (2013.01)

(56) References Cited

U.S. PATENT DOCUMENTS

| | | | |
|---|---|---|---|
| 2008/0114499 A1 | 5/2008 | Hakim et al. | |
| 2010/0123436 A1 | 5/2010 | Herrod et al. | |
| 2011/0089905 A1* | 4/2011 | Yano | 320/132 |

FOREIGN PATENT DOCUMENTS

| | | |
|---|---|---|
| JP | 10-300169 A | 11/1998 |
| JP | 2000-253586 A | 9/2000 |
| JP | 2001-095180 A | 4/2001 |
| JP | 2003-79054 A | 3/2003 |
| JP | 2003-189470 A | 7/2003 |
| JP | 2007-336796 A | 12/2007 |
| JP | 2009-194947 A | 8/2009 |
| JP | 2009-254221 A | 10/2009 |
| JP | 2009-284586 A | 12/2009 |
| JP | 2010-016999 A | 1/2010 |

OTHER PUBLICATIONS

International Search Report issued in International Application No. PCT/JP2011/064903 issued on Oct. 4, 2011.

* cited by examiner

CHARGE/DISCHARGE CONTROL APPARATUS

RELATED APPLICATIONS

This application is the U.S. National Phase under 35 U.S.C. §371 of International Application No. PCT/JP2011/064903, filed on Jun. 29, 2011, which in turn claims the benefit of Japanese Application No. 2010-150303, filed on Jun. 30, 2010, the disclosures of which Applications are incorporated by reference herein.

TECHNICAL FIELD

The present invention relates to a charge/discharge control apparatus that controls charging/discharging of a rechargeable battery.

BACKGROUND ART

Recent years have seen an increasing number of cases where an electric power user introduces a charging system capable of power peak shaving. In this type of charging system, a rechargeable battery is charged during a time zone in which power usage is low, and electricity thus charged is discharged from the rechargeable battery during a time zone in which the power usage reaches its peak so that peak power of the power usage is reduced. Furthermore, there have also been an increasing number of cases of introducing a charging system in which a rechargeable battery is charged with less costly midnight electricity, and the electricity is discharged in the daytime so that a daytime electricity cost is reduced. The introduction of these types of charging systems allows a total electricity cost to be reduced.

As a rechargeable battery that is incorporated into such a charging system, typically, a secondary battery such as a lithium-ion battery, a nickel metal hydride battery, a lead battery, or the like is used. A lithium-ion battery, in particular, is lightweight and high in capacity and in output and thus has been receiving attention as a rechargeable battery for the above-described types of charging systems.

LIST OF CITATIONS

Patent Literature

Patent Document 1: JP-A-2009-194947

SUMMARY OF THE INVENTION

Technical Problem

The life span of a lithium-ion battery can vary largely depending on how the lithium-ion battery is used. Recovering an initial cost of introducing a battery by reducing the electric power cost requires that the battery have as long a life span as possible. One factor causing a decrease in battery life span is that charging/discharging is performed an increased number of times, and other such factors include keeping a battery in a fully charged state at a high temperature, overcharging a battery, and over-discharging a battery.

Now, a case is assumed where, in a charging system in which a lithium-ion battery is charged during a time zone in which power usage is low and is discharged during a time zone in which the power usage reaches its peak, the lithium-ion battery is charged to an almost fully charged state during, as the time zone in which power usage is low, a midnight time zone in which the electricity cost is low and is discharged during a time zone on a next day when the power usage reaches its peak (for example, around noon). In this case, the lithium-ion battery is kept in an almost fully charged state for a long time. That is, one of the factors causing a decrease in battery life span arises in this case. Furthermore, in a situation where an ambient temperature around the battery is high such as in summer, a greater degree of capacity deterioration occurs in the battery, leading to a further decrease in the life span of the battery. Herein, capacity deterioration refers to a state where an initial full charge capacity can no longer be achieved even by charging to a fully charged state. In general, when the capacity of a battery is decreased to about 60% of its initial full charge capacity, it is judged that the battery has reached the end of its life span.

The present invention has been made in view of the above, and it is an object of the present invention to provide a technique for, in a system in which a rechargeable battery is charged when power usage is low and is discharged when the power usage is high, increasing the life span of the rechargeable battery.

Solution to the Problem

A charge/discharge control apparatus according to a certain aspect of the present invention is a charge/discharge control apparatus that controls charging/discharging of a rechargeable battery and includes: an estimation portion that estimates power usage per unit time period; and a rechargeable battery control portion that performs control such that, based on a result of the estimation by the estimation portion, an excess amount of power over a target power value within the unit time period is charged into the rechargeable battery and is discharged from the rechargeable battery during a time zone in which the target power value is exceeded. In the rechargeable battery control portion, an upper limit value of a charge amount with respect to full charge of the rechargeable battery is set. In a case where the rechargeable battery needs to be charged beyond the upper limit value, the rechargeable battery control portion charges the rechargeable battery to the upper limit value during a time zone in which the power usage estimated by the estimation portion is low, and charges thereinto an excess over the upper limit value during a time zone close to the time zone in which the target power value is exceeded. Herein, a charge amount refers to a present amount of electricity stored, and this term encompasses, in addition to a ratio thereof to full charge (a state of charge SOC: "%"), an absolute amount "Ah" of a charge amount. A state of charge SOC is defined as a present charge amount (the absolute amount "Ah") of a rechargeable battery / a charge amount (the absolute amount "Ah") at full charge.

Advantageous Effects of the Invention

According to the present invention, in a system in which a rechargeable battery is charged when power usage is low and is discharged when the power usage is high, the life span of the rechargeable battery can be increased.

DESCRIPTION OF EMBODIMENTS

Figure 1:
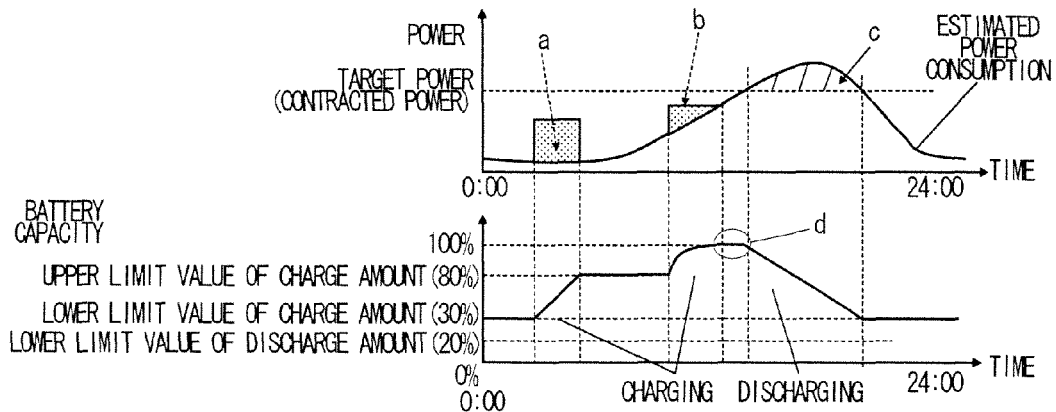
[FIG. 1] A diagram for explaining a charge/discharge method according to an embodiment of the present invention.

First, prior to a detailed description of an embodiment of the present invention, the following describes an outline of the embodiment of the present invention. FIG. 1 is a diagram for explaining a charge/discharge method according to the embodiment of the present invention. A graph on the upper side in FIG. 1 shows an estimated amount of power consumption per unit time period in a certain facility, and a graph on the lower side in FIG. 1 shows a charge amount per unit time period of a rechargeable battery installed in the facility, which corresponds to the estimated power consumption. As shown in FIG. 1, power consumption of a next day is estimated, and an amount of power (hereinafter, where appropriate, referred to as an excess amount of power (see a region "c")) by which the estimated power consumption exceeds a target power value (herein, electric power supplied under contract with a power company) is charged during a time zone in which power usage is low (see a block "a"). In this case, however, an excess over an upper limit value of a charge amount (for example, 80% of full charge) is charged immediately before a time zone in which discharging is performed (see a block "b"). This extremely reduces a length of time in which the rechargeable battery is at full charge (see a circled area "d") and thus can prevent deterioration of the battery.

Figure 2:
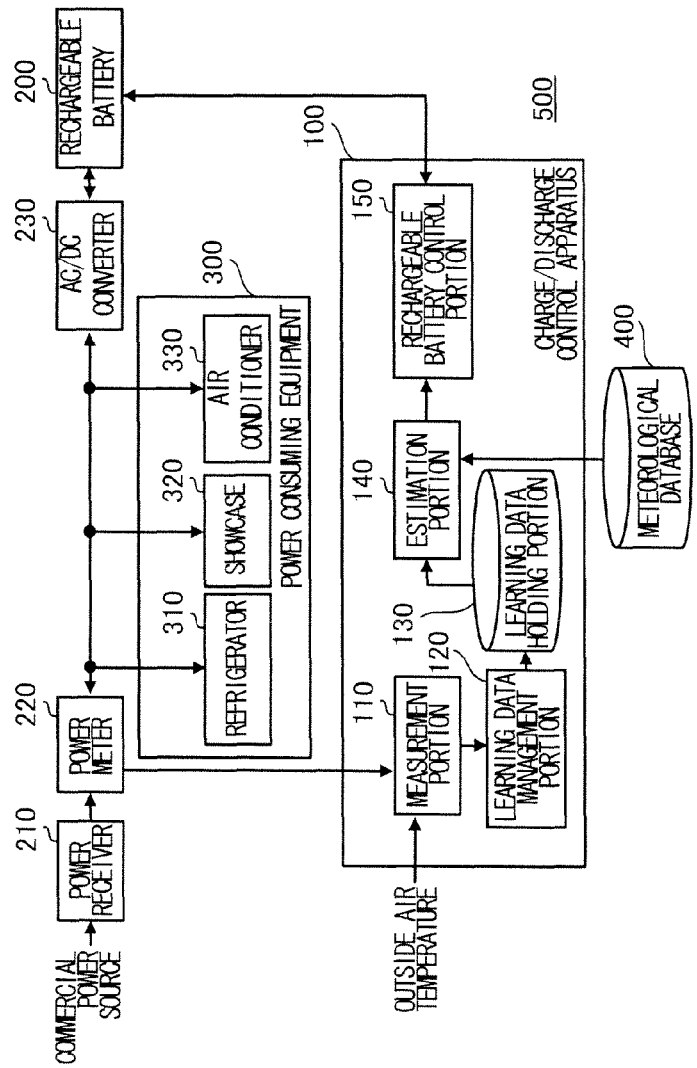
[FIG. 2] A diagram showing a configuration of a charge/discharge system according to the embodiment of the present invention.

FIG. 2 is a diagram showing a configuration of a charge/discharge system 500 according to the embodiment of the present invention. The following description assumes a case where the charge/discharge system 500 according to this embodiment is installed in a facility such as a supermarket, a convenience store, or the like. There is, however, no limitation thereto.

The charge/discharge system 500 includes a charge/discharge control apparatus 100, a rechargeable battery 200, a power receiver 210, a power meter 220, an AC/DC convertor 230, and power consuming equipment 300. In the facility, as the power consuming equipment 300, for example, a refrigerator 310, a showcase 320, and an air conditioner 330 are provided. This embodiment assumes that the rechargeable battery 200 is a lithium-ion battery.

The power receiver 210 introduces commercial power (AC power) into the facility. The power meter 220 measures actual power consumption of the power consuming equipment 300 in the facility and outputs a result of the measurement to the charge/discharge control apparatus 100 (to be more exact, an after-mentioned measurement portion 110). Herein, for example, an average value of power consumption per unit time (for example, 10 minutes) is defined as actual power consumption. The AC/DC convertor 230 converts alternating current power supplied from a commercial power source into direct current power and supplies the direct current power to the rechargeable battery 200. The AC/DC convertor 230 also converts direct current power supplied from the rechargeable battery 200 into alternating current power and supplies the alternating current power to the power consuming equipment 300 in the facility.

The charge/discharge control apparatus 100 controls charging/discharging of the rechargeable battery 200. The charge/discharge control apparatus 100 includes the measurement portion 110, a learning data management portion 120, a learning data holding portion 130, an estimation portion 140, and a rechargeable battery control portion 150. Although each of these constituent components can be realized, in terms of hardware, by an arbitrary processor or memory or any other type of LSI and are realized, in terms of software, by, for example, a program loaded into a memory, depicted herein are functional blocks that are realized by such hardware and software used in a coordinated manner. It is therefore understandable to those skilled in the art that these functional blocks can be realized in various forms by hardware alone, software alone, or the combination of hardware and software.

The measurement portion 110 acquires environmental data at a given cycle (for example, every 10 minutes). Environmental data includes an air temperature and a humidity outside the facility, a temperature and a humidity inside the facility, and so on. For the sake of simplifying an explanation, this embodiment describes below a case where an air temperature outside the facility (hereinafter, referred to as an outside air temperature), which is highly correlated with power consumption, is acquired. The measurement portion 110 also acquires actual power consumption of the power consuming equipment 300 at a given cycle (for example, every 10 minutes) from the power meter 220.

The learning data management portion 120 registers, as learning data, environmental data (in this embodiment, an outside air temperature) and actual power consumption acquired by the measurement portion 110 in the learning data holding portion 130.

Figure 3:
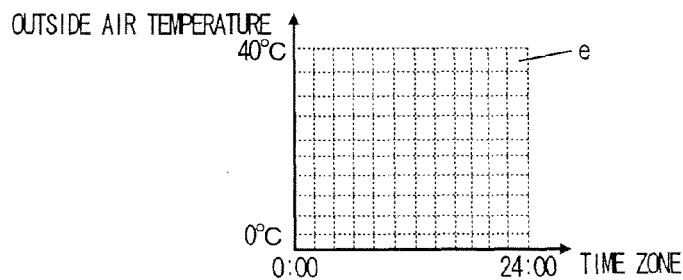
[FIG. 3] A diagram showing one example of a data structure in a leaning data holding portion.

FIG. 3 is a diagram showing one example of a data structure in the learning data holding portion 130. FIG. 3 depicts an example in which a two-dimensional table using a time zone and an outside air temperature as parameters is formulated, and, as learning data, measured values of actual power consumption are stored in cells "e" in the table. For example, a configuration is possible in which values of actual power consumption measured in the most recent 10 measurements are stored in the cells "e". As environmental conditions used to obtain learning data, in addition to a time zone, an air temperature, and a humidity, other parameters such as audience data, an estimated number of visitors, a bargain day, a day of the week, and so on can be used.

The estimation portion 140 estimates power usage per unit time period. For example, the estimation portion 140 estimates power usage per unit time period of a certain day on a day before the certain day. More specifically, the estimation portion 140 acquires learning data on power usage (for example, actual power consumption) recorded using a time zone and at least one environmental condition (in this embodiment, an outside air temperature) as parameters and estimated values of the environmental condition (in this embodiment, an outside air temperature) of a unit time period, and based thereon, estimates power usage per unit time period.

When a predetermined estimation time has come, the estimation portion 140 acquires, from a meteorological database 400 formulated in an external server to which the estimation portion 140 is connected via a network (for example, the Internet), meteorological data (in this embodiment, an outside air temperature per unit time period) of a next day. Based on the outside air temperature per unit time period, the estimation portion 140 refers to the learning data holding portion 130 and estimates power usage per unit time period of the next day.

Figure 4:
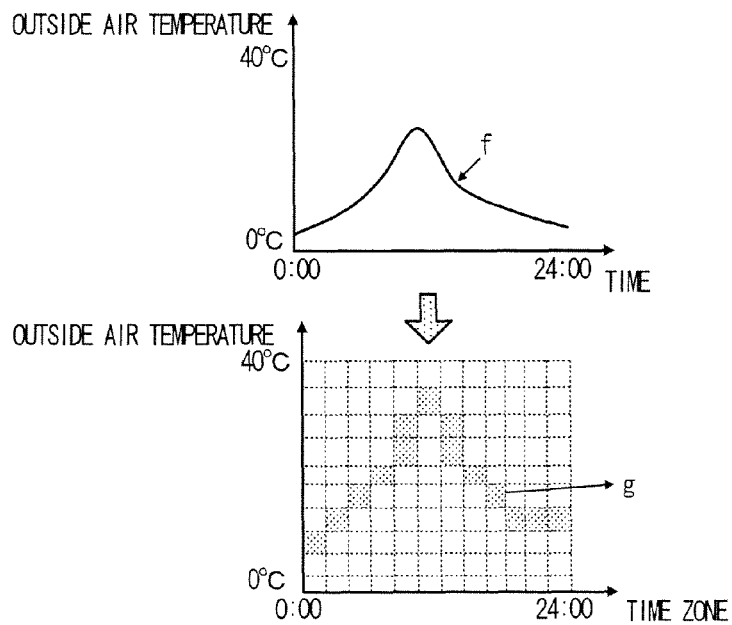
[FIG. 4] A diagram for explaining a process of estimating power usage per unit time period of a next day based on an outside air temperature per unit time period of the next day.

FIG. 4 is a diagram for explaining a process of estimating power usage per unit time period of a next day based on an outside air temperature per unit time period of the next day. A graph on the upper side in FIG. 4 shows an outside air temperature "f" per unit time period of a next day acquired from the meteorological database 400. A graph on the lower side in FIG. 4 shows the table shown in FIG. 3, in which values of actual power consumption are stored. Based on the data of actual power consumption obtained in the most recent 10 measurements, which are stored in the cells in the table, the estimation portion 140 determines a value of estimated power consumption with respect to each time zone. Cells "g" in a gray scale indicate cells corresponding to values of the outside air temperature "f" per unit time period of the next day. As a method for determining estimated power consumption, for example, maximum values (average values may be used instead) of actual power consumption obtained in the most recent 10 measurements are selected and used.

Based on a result of the estimation by the estimation portion 140, the rechargeable battery control portion 150 performs control such that an excess amount of power over a target power value within the above-described unit time period (in this embodiment, the day as an estimation object) is charged into the rechargeable battery 200 and is discharged from the rechargeable battery 200 during a time zone in which the target power value is exceeded.

In the rechargeable battery control portion 150, depending on a characteristic of the rechargeable battery 200, an upper limit value of a charge amount (in this embodiment, for example, 80%) with respect to full charge of the rechargeable battery 200 is preset. Deterioration of a rechargeable battery is accelerated to a degree varying with a charge amount, and particularly in a case where the rechargeable battery is almost fully charged or a charge amount thereof is almost nil, compared with a case where the charge amount thereof is about half, the above-described acceleration degree is increased. The above-described upper limit value and an after-mentioned lower limit value are set to include therebetween a range of values at which the deterioration acceleration degree is increased. This specification describes this as a characteristic of a rechargeable battery. In a case where the rechargeable battery 200 needs to be charged beyond the upper limit value, the rechargeable battery control portion 150 charges the rechargeable battery 200 to the upper limit value during a time zone in which power usage per unit time period estimated by the estimation portion 140 is low compared with any other time period, and charges thereinto an excess over the upper limit value during a time zone closer to a time zone in which the target power value is exceeded than the time zone in which the rechargeable battery 200 is charged to the upper limit value.

The above-described time zone in which power usage is low may be regarded as a time zone in which estimated power consumption does not exceed a predetermined set value, a time zone in which a cumulative sum of values of estimated power consumption is smallest, or a time zone including a time when estimated power consumption is lowest. Typically, such a time zone corresponds to a midnight time zone. In Japan, the electricity cost is set to be lower in a midnight time zone than in a normal time zone (as of June, 2010). Hence, normally, the rechargeable battery control portion 150 charges the rechargeable battery 200 to the upper limit value during the time zone in which the electricity cost is set to be lower than in a nomial time zone, and thus a further reduction in electric power cost can be expected.

Preferably, the time zone closer to the time zone in which the target power value is exceeded is a time zone in which charging of an excess over the upper limit value is scheduled to start such that it is ended at or immediately before a starting time of the time zone in which the target power value is exceeded. In this case, a length of time in which the rechargeable battery 200 is in a fully charged state can be maximally reduced.

In the rechargeable battery control portion 150, depending on the characteristic of the rechargeable battery 200, a lower limit value of the charge amount (in this embodiment, for example, 50%) with respect to full charge of the rechargeable battery 200 may be set. In this case, when a ratio of a charge amount obtained by subtracting an excess amount of power estimated by the estimation portion 140 from a present charge amount of the rechargeable battery 200 to full charge of the rechargeable battery 200 is not less than the lower limit value, the rechargeable battery control portion 150 does not perform prior charging with respect to the rechargeable battery 200. Conversely, when the above-described ratio of a charge amount to full charge of the rechargeable battery 200 is smaller than the lower limit value, the rechargeable battery control portion 150 performs charging such that a charge amount remaining after discharging of the excess amount of power attains the lower limit value.

The following describes a specific example for explaining this. It is premised that, where an excess amount of power is indicated as X [kWh], a full charge amount of the rechargeable battery 200 as Y [kWh], and a present charge amount as Z [kWh], a percentage of an excess amount of power to a full charge amount is expressed as $((X/Y) \times 100)\%$, and a percentage of a present charge amount to a full charge amount is expressed as $((Z/Y) \times 100)\%$. In the following, the former and latter percentages are indicated as x % and z %, respectively.

Figure 5:
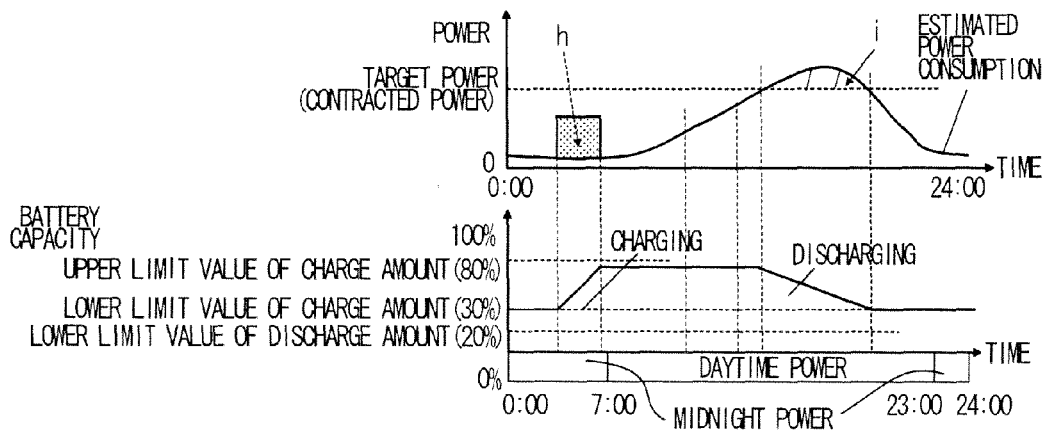
[FIG. 5] A diagram for explaining a charge/discharge method in a case where charging beyond an upper limit value of a charge amount is not performed.
Figure 6:
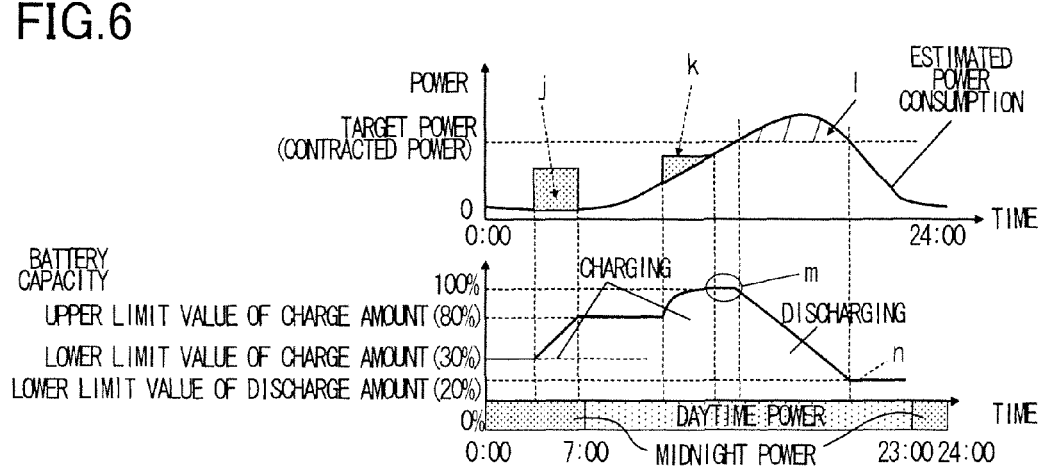
[FIG. 6] A diagram for explaining a charge/discharge method in a case where charging beyond an upper limit value of a charge amount needs to be performed.
Figure 7:
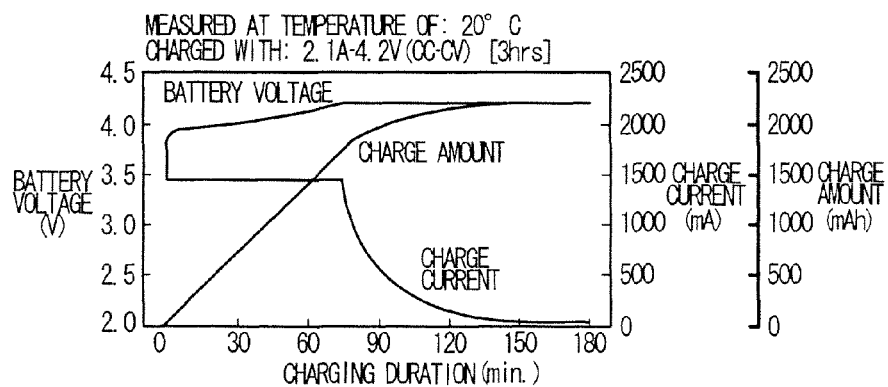
[FIG. 7] A diagram showing a relationship between a charging duration and a charge amount of a rechargeable battery.

FIG. 5 is a diagram for explaining a charge/discharge method in a case where charging beyond an upper limit value of a charge amount is not performed. FIG. 6 is a diagram for explaining a charge/discharge method in a case where charging beyond full charge needs to be performed. FIG. 7 is a diagram showing a relationship between a charging duration and a charge amount of the rechargeable battery 200.

In a case where a difference obtained by subtracting an excess amount of power from a present charge amount is not less than the above-described lower limit value (in this embodiment, for example, 30%) ($z-x \geq$ lower limit value), the rechargeable battery control portion 150 performs control such that charging with respect to the rechargeable battery 200 is not performed. This aims to reduce the number of times charging/discharging is performed and thereby to prevent capacity deterioration of the rechargeable battery 200. In a case where the above-described difference is smaller than the lower limit value (z−x<lower limit value), during a time zone in which estimated power usage is low, the rechargeable battery control portion 150 performs charging of an amount of (lower limit value+x−z)% such that a charge amount remaining after discharging of the excess amount of power attains the lower limit value.

A charge current for charging a rechargeable battery is determined based on a charging characteristic of the rechargeable battery. During a time zone in which a target power value is presumed to be exceeded as a result of charging, however, the rechargeable battery control portion 150 sets a charge current value to be decreased so that the target power value will not be exceeded. A charging duration is determined based on a charging characteristic (see FIG. 7) of a battery used. In a case where a charge current value is set to be decreased, a charging duration is set to be increased. For example, when a charge current value is set to be decreased by half, presumably, a charging duration becomes double. Based on the charging duration thus presumed, the rechargeable battery control portion 150 starts charging such that the charging is completed by an ending time of a time zone in which power usage is low (for example, a midnight time zone (herein, 23:00 to 7:00)).

A graph on the upper side in FIG. 5 shows estimated power consumption per unit time period in a facility, and a graph on the lower side in FIG. 5 shows a charge amount per unit time period of the rechargeable battery 200 installed in the facility, which corresponds to the estimated power consumption. The estimation portion 140 estimates power consumption of a next day, and the rechargeable battery control portion 150 performs charging of an excess amount of power obtained by subtracting the target power value from the estimated power consumption (see a region "i") during a time zone in which power usage is low (see a block "h"). Herein, the charging is completed by a time earlier than 7:00 a.m., until which an electricity billing rate for a midnight time zone is applied. In FIG. 5, charging of an excess over the above-described upper limit value is not necessary, and there is no time period in which full charge is achieved.

On the other hand, in a case where a charge amount after charging (lower limit value+x)% is larger than the above-described upper limit value, the following process is performed. That is, an excess over the above-described upper limit value (lower limit value+x−upper limit value)% is charged immediately before a time zone in which discharging is performed (hereinafter, referred to as second charging). A charging duration of the second charging is also determined based on a charging characteristic of a rechargeable battery used (see FIG. 7). Based on the charging duration thus determined, the rechargeable battery control portion 150 starts the charging such that the charging is completed by a time immediately before the time zone in which discharging is performed.

A graph on the upper side in FIG. 6 shows estimated power consumption per unit time period in a facility, and a graph on the lower side in FIG. 6 shows a charge amount per unit time period of the rechargeable battery 200 installed in the facility, which corresponds to the estimated power consumption. The estimation portion 140 estimates power consumption of a next day, and the rechargeable battery control portion 150 performs charging of an excess amount of power obtained by subtracting the power value from the estimated power consumption (see a region "l") during a time zone in which power usage is low (see a block "j") (hereinafter, referred to as first charging). Herein, the first charging is completed by a time earlier than 7:00 a.m., until which an electricity billing rate for a midnight time zone is applied. The first charging is performed to such an extent that the above-described upper limit value is not exceeded. The rechargeable battery control portion 150 performs, as the second charging, charging of an excess over the above-described upper limit value immediately before a time zone in which discharging is performed (see a block "k"). This can reduce a length of time at full charge (see a circled area m″).

In the rechargeable battery control portion 150, depending on the characteristic of the rechargeable battery 200, a lower limit value of a discharge amount (in this embodiment, for example, 20%) with respect to full charge of the rechargeable battery 200 may be set. In this case, the rechargeable battery control portion 150 performs discharging to such an extent that the discharge amount does not fall below the lower limit value thereof. To explain this using the above-described specific example, during a time zone in which estimated power consumption exceeds a target power value, z% is discharged from the rechargeable battery 200 to such an extent that the discharge amount does not fall below a first lower limit value thereof (see "h" in FIG. 6). This can suppress capacity deterioration due to over-discharging. Moreover, in the rechargeable battery control portion 150, a second lower limit value of a discharge amount (in this embodiment, for example, 10%) and a number of times of discharging to a second lower limit value (a number of times a discharge amount falls below a first lower limit value and discharging to a second lower limit value is performed) may be set. The above-described number of times of discharging to a second lower limit value can be changed depending on a characteristic of a rechargeable battery and may be an absolute number of times or a number of times per unit time period (for example, 10 times per year or the like). In that case, if the above-described number of times of discharging to a second lower limit value is not more than a predetermined number of times, the rechargeable battery control portion 150 may permit discharging to the second lower limit value. That is, discharging to the second lower limit value below the first lower limit value of the discharge amount may be performed.

Figure 8:
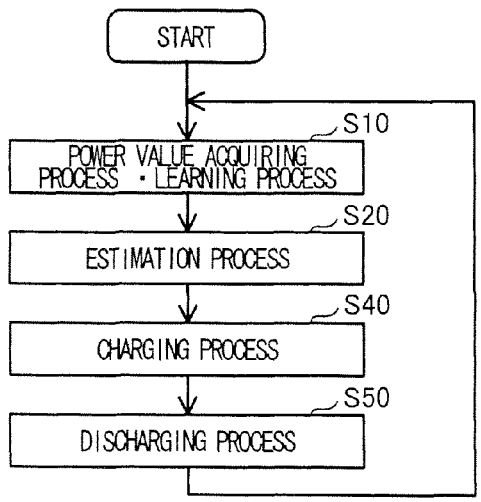
[FIG. 8] A flow chart showing an entire operation of the charge/discharge system according to the embodiment of the present invention.

FIG. 8 is a flow chart showing an entire operation of the charge/discharge system 500 according to the embodiment of the present invention. Details of respective processes performed in the operation will be described with reference to FIGS. 9 to 12. The measurement portion 110 executes a power value acquiring process, and the learning data management portion 120 executes a learning process (S10). The estimation portion 140 executes an estimation process (S20). The rechargeable battery control portion 150 executes a charging process (S40). The rechargeable battery control portion 150 executes a discharging process (S50). These processes are executed repeatedly.

Figure 9:
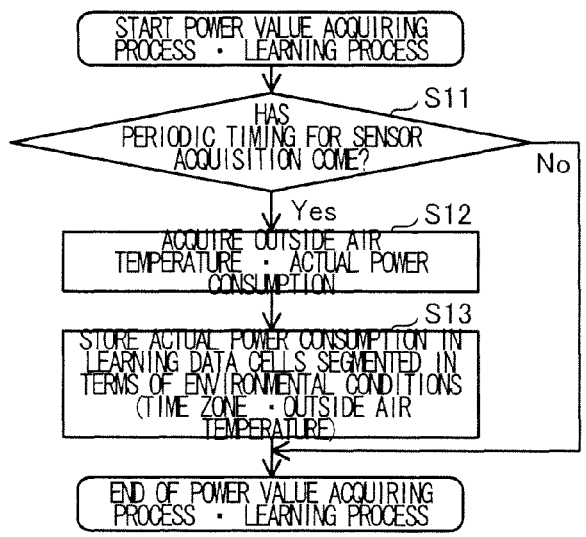
[FIG. 9] A flow chart showing details of a power value acquiring process and a learning process.

FIG. 9 is a flow chart showing the details of the power value acquiring process and the learning process. The measurement portion 110 judges whether or not periodic timing for sensor acquisition has come (S11), and if it has come (Yes at S11), acquires an outside air temperature and actual power consumption (S12). The learning data management portion 120 stores values of the actual power consumption in learning data cells segmented in terms of environmental conditions (in this embodiment, in terms of a time zone and an outside air temperature) (S13).

Figure 10:
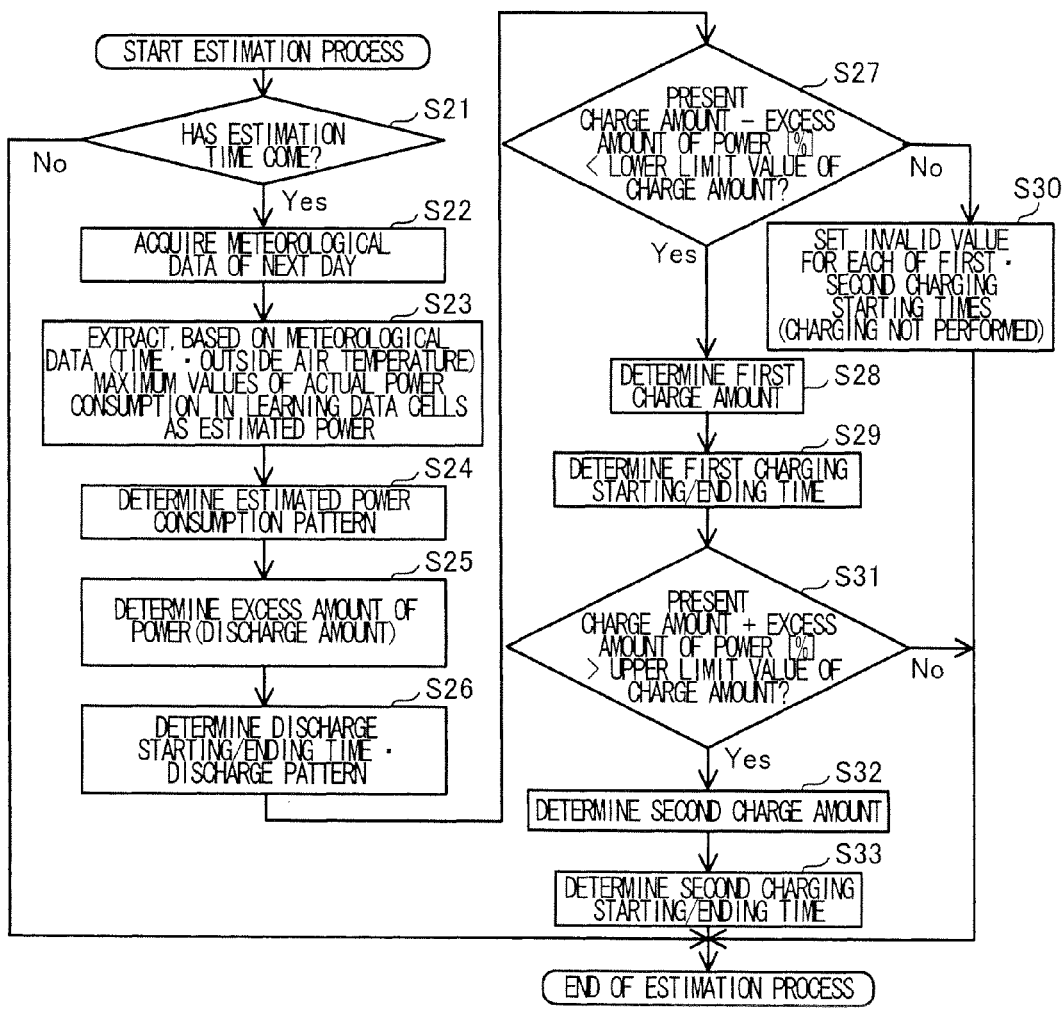
[FIG. 10] A flow chart showing details of an estimation process.

FIG. 10 is a flow chart showing the details of the estimation process. The estimation portion 140 judges whether or not an estimation time designated by a user (for example, 23:00 on a day before) has come (S21), and if it has come (Yes at S21), acquires meteorological data (in this embodiment, an outside air temperature per unit time period) of a next day (S22). Based on the meteorological data, maximum values stored in the learning data cells segmented in terms of a time zone and an outside air temperature are extracted as values of estimated power (S23), and an estimated power consumption pattern is determined (S24).

Based on the estimated power consumption pattern, the estimation portion 140 determines an excess amount of power (S25), and based thereon, determines a discharge starting time, a discharge ending time, and a discharge pattern (S26). A discharge pattern refers to an excess amount of power per unit time, which is obtained by subtracting a target power value from the estimated power consumption pattern.

The estimation portion 140 compares a value obtained by subtracting an excess amount of power from a present charge amount with a lower limit value of a charge amount (S27). If the former is less than the latter (Yes at S27), the estimation portion 140 determines a first charge amount of charging to be performed during a time zone in which power usage is low (S28) and determines a starting time and an ending time of the charging (S29). If the former is not less than the latter (No at S27), charging is not performed (S30). More specifically, an invalid value is set for each of the first charging starting time and a second charging starting time.

In a case where the first charging is executed, the estimation portion 140 compares a value obtained by adding an excess amount of power to a present charge amount with an upper limit value of a charge amount (S31). If the former exceeds the latter (Yes at S31), the estimation portion 140 determines a second charge amount of charging to be performed during a time zone immediately before discharging (S32) and determines the starting time and an ending time of the charging (S33). If the former is not more than the latter (No at S31), the processes at Steps S32 and 33 are skipped. Though not shown in FIG. 10, during a time zone in which a target power value is presumed to be exceeded as a result of charging, a charge current value is set to be decreased, and a charging duration in that case is determined.

Figure 11:
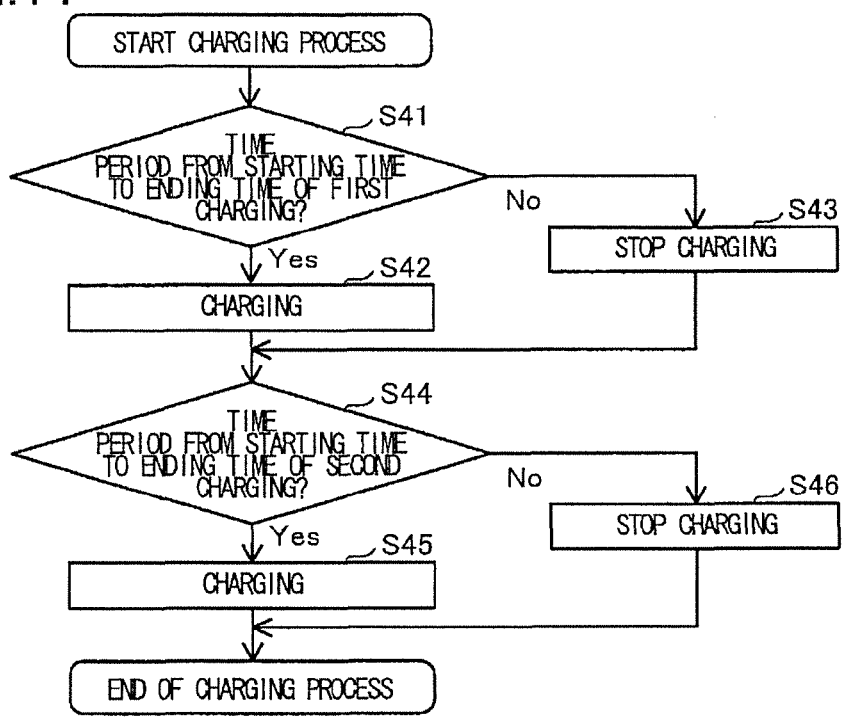
[FIG. 11] A flow chart showing details of a charging process.

FIG. 11 is a flow chart showing the details of the charging process. During a time period from the starting time to the ending time of the first charging (Yes at S41), the rechargeable battery control portion 150 performs the first charging with respect to the rechargeable battery 200 (S42). In a time period other than this time period (No at S41), the first charging is stopped (S43). In a case where an invalid value is set for the first charging starting time, the charging is not performed.

During a time period from the starting time to the ending time of the second charging (Yes at S44), the rechargeable battery control portion 150 performs the second charging with respect to the rechargeable battery 200 (S45). In a time period other than this time period (No at S44), the second charging is stopped (S46). In a case where an invalid value is set for the second charging starting time, the charging is not performed.

Figure 12:
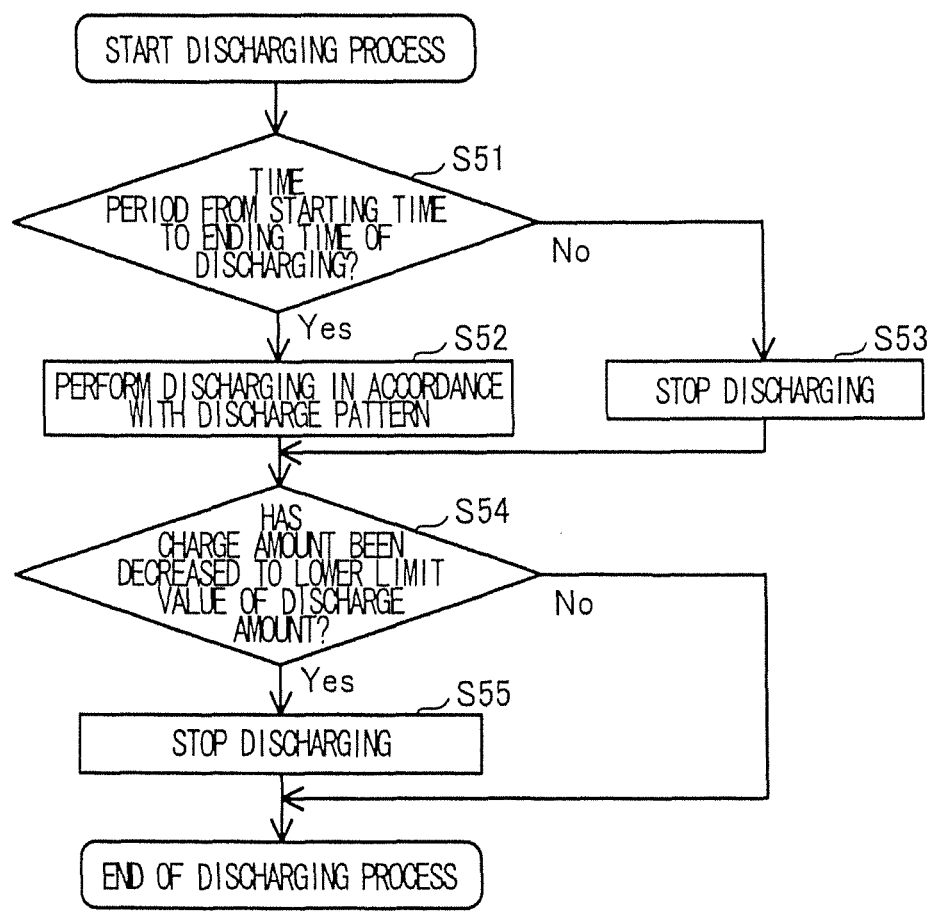
[FIG. 12] A flow chart showing details of a discharging process.

FIG. 12 is a flow chart showing the details of the discharging process. During a time period from the starting time to the ending time of discharging (Yes at S51), the rechargeable battery control portion 150 performs the discharging in accordance with the discharge pattern (S52). In a time period other than this time period (No at S51), the discharging is stopped (S53).

If a charge amount of the rechargeable battery 200 is not more than a lower limit value of a discharge amount (Yes at S54), the rechargeable battery control portion 150 stops the discharging (S55). If the charge amount exceeds the lower limit value of the discharge amount (No at S54), the discharging is performed in accordance with the discharge pattern.

As discussed above, according to this embodiment, in a system in which a rechargeable battery is charged when power usage is low and is discharged when the power usage is high, a length of time at full charge is reduced, and thus the life span of the rechargeable battery can be increased. Furthermore, the number of times charging/discharging is performed is reduced, which also allows the life span of the rechargeable battery to be increased. Moreover, over-discharging is suppressed, which also allows the life span of the rechargeable battery to be increased. In addition, charging is performed during a midnight time zone, and thus a reduction in electricity cost can be achieved.

The foregoing has discussed the present invention based on the embodiment. It is understandable to those skilled in the art that the embodiment is only illustrative and may be variously modified in terms of combinations of constituent components and processes, and that such modifications also fall within the scope of the present invention.

Figure 13:
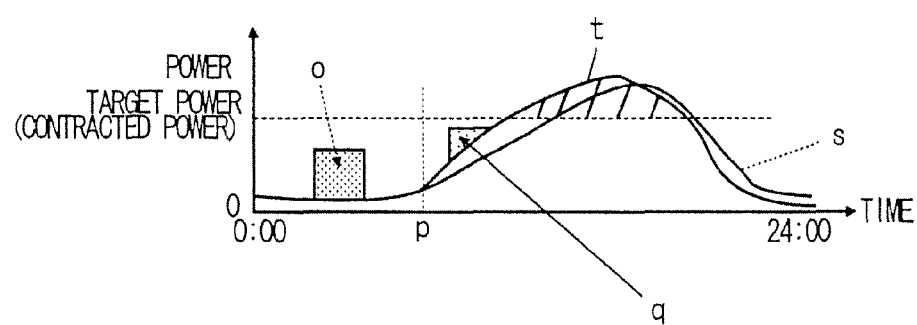
[FIG. 13] A diagram for explaining a charge/discharge method according to Modification Example 1.

FIG. 13 is a diagram for explaining a charge/discharge method according to Modification Example 1, In FIG. 13, a transition curve "s" indicates a power consumption pattern estimated on a day before at, for example, 23:00. A transition curve "r" indicates a power consumption pattern estimated in the morning on a present day at a time "p" (for example, 7:00) based on up-to-date meteorological information acquired from the meteorological database 400.

Based on the power consumption pattern indicated by the transition curve "s", the estimation portion 140 determines an excess amount of power, and based thereon, charging is performed during a time zone in which power usage is low (see a block "o"). Based on the power consumption pattern indicated by the transition curve "r", which is obtained by performing re-estimation in the morning on the present day, the estimation portion 140 re-determines an excess amount of power. If a result of the re-determination finds that a present charge amount is not sufficient enough to fully obtain the re-determined excess amount of power, an amount of power over an obtainable amount is charged immediately before discharging (see a block "q").

The estimation portion 140 may be configured such that, every time meteorological information in the meteorological database 400 is updated, it performs the above-described re-determination of an excess amount of power and changes a charge amount accordingly. As discussed above, according to Modification Example 1, accuracy in estimating a power consumption pattern can be increased, and thus further optimization of charge/discharge control can be achieved.

Figure 14:
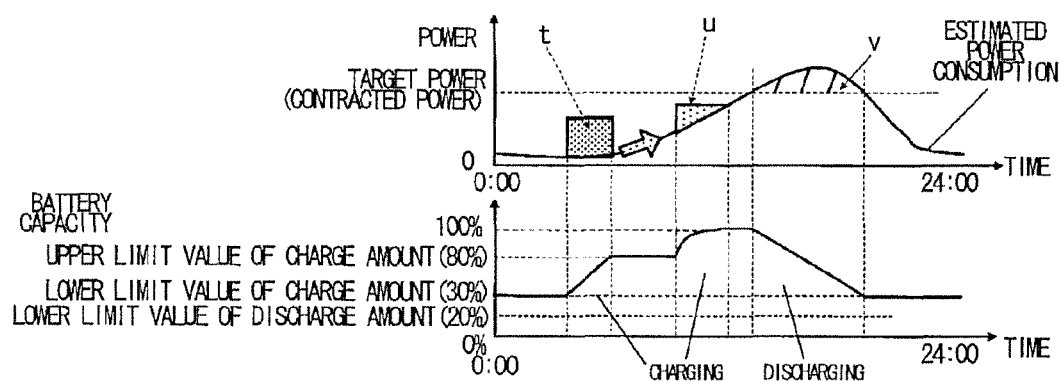
[FIG. 14] A diagram for explaining a charge/discharge method according to Modification Example 2.

FIG. 14 is a diagram for explaining a charge/discharge method according to Modification Example 2. In the foregoing embodiment, as a time zone in which power usage is low, a midnight time zone in which the electricity cost is low is adopted as an example. In Japan, the electricity cost varies between in a daytime power time zone and in a midnight power time zone, with midnight power set to be cheaper compared with daytime power. There may be a case, however, where the electricity cost does not vary depending on a time zone.

As shown in FIG. 7 referred to above, when charging a lithium-ion battery, a general way is to perform constant-current charging to about 80% of a charge amount at a high speed and to subsequently perform constant-voltage charging at a low speed. Thus, preferably, the constant-current charging to not more than about 80% of a charge amount is performed during a time zone in which power usage is low.

In view of the above-described findings without regard to the electricity cost, the rechargeable battery control portion 150 could be configured as follows. That is, based on power usage per unit time period estimated by the estimation portion 140, the rechargeable battery control portion 150 schedules charging to the above-described upper limit value such that it is completed by a time when the power usage being falling or leveling off turns to rise.

A graph on the upper side in FIG. 14 shows estimated power consumption per unit time period in a facility, and a graph on the lower side in FIG. 14 shows a charge amount per unit time period of the rechargeable battery 200 installed in the facility, which corresponds to the estimated power consumption. The estimation portion 140 estimates power consumption of a next day, and the rechargeable battery control portion 150 schedules the first charging such that it is completed by a time immediately before a gradient of variations in the estimated power consumption rises (see a block "t"). The rechargeable battery control portion 150 performs, as the second charging, charging of an excess over the above-described upper limit value immediately before a time zone in which discharging is performed (see a block "u").

As discussed above, according to Modification Example 2, constant-current charging is performed during a time zone in which power usage is low, so that charging can be performed such that a target power value is not exceeded, and a charging duration can be reduced.

In the foregoing discussion, as an example, the charge/discharge system 500 is applied to a facility such as a store or the like. The charge/discharge system 500, however, can be applied also to an individual household.

List of Reference Symbols

100 charge/discharge control apparatus, 110 measurement portion, 120 leaning data management portion, 130 leaning data holding portion, 140 estimation portion, 150 rechargeable battery control portion, 200 rechargeable battery, 210 power receiver, 220 power meter, 230 AC/DC convertor, 300 power consuming equipment, 310 refrigerator, 320 showcase. 330 air conditioner, 400 meteorological database, 500 charge/discharge system

The invention claimed is:

1. A charge/discharge control apparatus that controls charging/discharging of a rechargeable battery, comprising:
   estimation circuitry which, in operation, estimates power usage per unit time period; and
   rechargeable battery control circuitry which, in operation, performs control in which, based on a result of the estimation by the estimation circuitry, power in an amount sufficient to allow discharging of an excess amount of power over a target power value within the unit time period is charged into the rechargeable battery, and an amount of power corresponding to the excess amount of power is discharged from the rechargeable battery during a time zone in which the target power value is exceeded,
   wherein in the rechargeable battery control circuitry, an upper limit value of a charge amount with respect to full charge of the rechargeable battery is set, and in a case where the rechargeable battery needs to be charged beyond the upper limit value, the rechargeable battery control circuitry charges the rechargeable battery to the upper limit value during a time zone in which the power usage estimated by the estimation circuitry is low, and charges thereinto an excess over the upper limit value during a time zone close to the time zone in which the target power value is exceeded.

2. The charge/discharge control apparatus according to claim 1, wherein
   in the rechargeable battery control circuitry, a lower limit value of the charge amount with respect to full charge of the rechargeable battery is set, and
   in a case where a charge amount obtained by subtracting the excess amount of power estimated by the estimation circuitry from a present charge amount of the rechargeable battery is not less than the lower limit value, the rechargeable battery control circuitry does not perform prior charging with respect to the rechargeable battery, and in a case where the charge amount obtained by the subtraction is lower than the lower limit value, the rechargeable battery control circuitry performs charging in which a charge amount remaining after the discharging of the excess amount of power attains the lower limit value.

3. The charge/discharge control apparatus according to claim 1, wherein
   in the rechargeable battery control circuitry, a first lower limit value of a discharge amount of the rechargeable battery is set, and
   the rechargeable battery control circuitry performs discharging to such an extent that the discharge amount does not fall below the first lower limit value of the discharge amount.

4. The charge/discharge control apparatus according to claim 3, wherein
   in the rechargeable battery control circuitry, a second lower limit value smaller than the first lower limit value of the discharge amount of the rechargeable battery and a number of times of discharging to the second lower limit value are further set, and
   in a case where the number of times of discharging to the second lower limit value is not more than a predetermined number of times, the rechargeable battery control circuitry permits the discharging to the second lower limit value.

5. The charge/discharge control apparatus according to claim 1, wherein the rechargeable battery control circuitry charges the rechargeable battery to the upper limit value during a time zone in which an electricity cost is set to be lower than in a normal time zone.

6. The charge/discharge control apparatus according to claim 1, wherein based on the power usage per unit time period estimated by the estimation circuitry, the rechargeable battery control circuitry schedules the charging to the upper limit value completed by a time when the power usage being falling or leveling off turns to rise.

7. The charge/discharge control apparatus according to claim 1, wherein the estimation circuitry acquires learning data on power usage recorded using a time zone and at least one environmental condition as parameters and estimated values of the environmental condition of the unit time period, and based thereon, estimates the power usage per unit time period.

8. A refrigerator system comprising the control apparatus according to claim 1.

9. The charge/discharge control apparatus according to claim 1, wherein the estimation circuitry formulates, using an outside air temperature as a parameter, learning data on the power usage per unit time period, acquires outside air temperature data of a next day from a meteorological database formulated in an external server, and, based on the learning data and the outside air temperature data, estimates the power usage per unit time period.

* * * * *